United States Patent [19]
Sasshofer et al.

[11] Patent Number: 5,167,890
[45] Date of Patent: Dec. 1, 1992

[54] MONOAXIALLY STRETCHED SHAPED ARTICLE OF POLYTETRAFLUOROETHYLENE AND PROCESS FOR PRODUCING THE SAME

[75] Inventors: Franz Sasshofer, Seewalchen; Reinhard Reinmüller, Timelkam; Christian H. F. Schlossnikl; Adalbert G. Wimmer, both of Vöcklabruck, all of Austria

[73] Assignee: Lenzing Aktiengesellschaft, Lenzing, Austria

[21] Appl. No.: 499,033

[22] Filed: Mar. 26, 1990

[30] Foreign Application Priority Data

Apr. 6, 1989 [AT] Austria ............................ A813/89

[51] Int. Cl.⁵ .......................... B29C 67/20; D01F 2/08; D01D 5/12; D02J 1/22
[52] U.S. Cl. .................................. 264/127; 264/175; 264/210.2; 264/288.8; 264/290.2
[58] Field of Search ............... 264/175, 210, 288, 290, 264/191, 184, 188, 127; 428/364

[56] References Cited

U.S. PATENT DOCUMENTS

| | | | |
|---|---|---|---|
| 3,953,566 | 4/1976 | Gore | 264/70 |
| 4,707,314 | 11/1987 | Kawahigashi et al. | 264/127 |
| 4,710,331 | 12/1987 | Nobuo et al. | 264/127 |

FOREIGN PATENT DOCUMENTS 370674  4/1983  Austria .
2025835  1/1980  United Kingdom .

*Primary Examiner*—George F. Lesmes
*Assistant Examiner*—Kathryne E. Shelborne
*Attorney, Agent, or Firm*—Brumbaugh Graves Donohue & Raymond

[57] ABSTRACT

To produce a monoaxially stretched shaped article of polytetrafluoroethylene (PTFE), a pasty mass containing PTFE powder is continuously shaped to a shaped body, which is fed over a plurality of rollers or rolls, heated and stretched. The shaped body is heated to a temperature of between 327° and 450° C. prior to stretching strain, it is sintered simultaneously and is then stretched. This process allows for the production of a monoaxially stretched shaped article of PTFE which has strength values in the stretching direction of at least 500 N/mm² and a delivery of between 1.80 and 2.30 g/cm³.

6 Claims, 1 Drawing Sheet

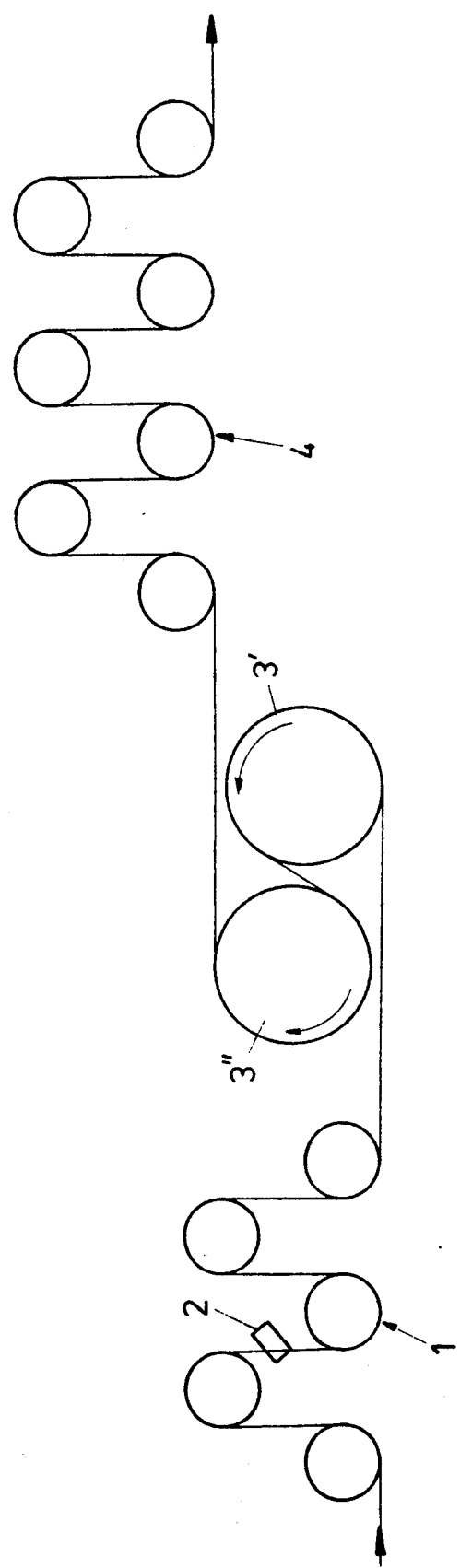

MONOAXIALLY STRETCHED SHAPED ARTICLE OF POLYTETRAFLUOROETHYLENE AND PROCESS FOR PRODUCING THE SAME

The invention relates to a monoaxially stretched article of polytetrafluoroethylene (PTFE) as well as to a process for its production.

Because of its thermal stability and its chemical inertness, PTFE is an appreciated material. However, there are some fields in which its use is limited, since one has not yet succeeded in producing a shaped article of PTFE which exhibits a high mechanical strength and at the same time a high density.

If such a material were processed to weaving yarns, for instance, it would be possible to manufacture particularly long-wearing fabrics of PTFE. The combination of excellent strength and high density also would be advantageous for wrapping electric conductors, the dielectric breakdown strength increasing along with the density.

At present, PTFE shaped articles having strengths up to 250 N/mm$^2$ are commercially available, yet their densities lie below 1 g/cm$^3$. These shaped articles are produced by stretching unsintered PTFE. On the other hand, the sintered PTFE shaped bodies known today have densities of about 2 g/cm$^3$, but strengths of no more than about 50 N/mm$^2$.

From AT-B 370 674 monoaxially stretched films of sintered PTFE are known, whose strengths in the stretching direction range between 50 N/mm$^2$ and 140 N/mm$^2$. These films are produced by pressing PTFE powder to a cylindrical shaped article at first. After this, the shaped article is sintered, whereupon the films are peeled off, heated to temperatures of at least 327° C. and stretched.

GB-A 2 025 835 describes the production of porous PTFE shaped articles according to the paste extrusion method, wherein a pasty mass substantially containing PTFE powder and a lubricant is pressed through spinnerets, after which the lubricant is removed by drying. Thereafter, the shaped article is heated to above the crystallite melting point of PTFE (327° C.) and stretched during heating. The strength of the shaped article obtained is the higher the larger the stretching ratio. However, the density of the shaped article decreases accordingly such that, for instance, at a stretch by 550%, the strength rises to approximately 42 N/mm$^2$, while the density drops to about 0.4 g/cm$^3$.

It is the object of the invention to provide a shaped article of PTFE which does not have the disadvantages pointed out above and exhibits both a high mechanical strength and a high density.

The PTFE shaped article according to the invention is monoaxially stretched, having strength values in the stretching direction of at least 500 N/mm$^2$, preferably of at least 700 N/mm$^2$, and a density of between 1.80 and 2.30 g/cm$^3$, preferably of between 2.00 and 2.20 g/cm$^3$, which shaped article preferably is designed as a film, tape, weaving yarn or sewing yarn. At the strength values indicated, yarns exhibit elongation rates of between 3% and 50%.

The monoaxially stretched PTFE shaped article according to the invention can be produced by continuously forming a pasty mass containing PTFE powder to a shaped body, feeding the shaped body over a plurality of rollers or rolls, heating and stretching the shaped body, wherein the shaped body is heated to a temperature of between 327° and 450° C., preferably of between 350° and 390° C., prior to stretching, being thus sintered and is then stretched.

An advantageous embodiment of this process according to the invention consists in that the shaped body is stretched between a roll or pair of rolls heated to a temperature of between 327° and 450° C., preferably of between 350° and 390° C., and an unheated take off unit.

It has proved useful to stretch at a ratio of between 1:5 and 1:30, preferably of between 1:10 and 1:20. When stretching at a ratio of 1:30, a strength of approximately 1150 N/mm$^2$ is obtained.

An embodiment of the process according to the invention will be explained in more detail by way of the drawing.

At first, PTFE powder, in a manner known per se, is mixed with a lubricant, stored for several hours at a temperature of between 20° and 50° C., and pressed to a shaped body at pressures ranging between 10 and 50 bar. This shaped body, also in a manner known per se, is then extruded to a rod through a single-hole spinneret and rolled to a film, which is freed from lubricant by drying.

This dried film is then continuously fed to the sintering and stretching plant schematically illustrated in the drawing. It consists essentially of a feeding means 1, two heated rolls 3', 3" and an unheated take off unit 4, the arrows in the drawing symbolizing the direction of rotation of the heated rolls 3', 3" and the pull off direction of the film.

The film transferred to the feeding means 1 is continuously guided over the heated rolls 3', 3" and sintered thereon. In doing so, the film preferably is wrapped around the rolls like an "S" in order to get heating from both sides. The rolls have been heated to a temperature of at least 327° C. Immediately after the sintering process, the film is stretched. The film is pulled off by the unheated take off unit 4, which, as illustrated in the drawing, comprises several reels. Finally, the stretched material is wound on suitable bobbin aggregates.

To produce tapes, the dried film advantageously is cut by means of a cutting bar 2 already when passing the feeding organ 1.

The invention will be explained in even more detail by way of the following examples.

EXAMPLE 1

100 parts of PTFE emulsion powder and 23 parts of petrol (boiling range 186° to 214° C.) were pressed to a cylindrical rod, calendered to a film having a thickness of 0.1 mm and dried. Then the film was supplied to the feeding means 1, cut into strips of 6 mm width, guided over rolls 3', 3" heated to 380° C. whilst being sintered, and stretched at a ratio of 1:15 by these rolls. The tape obtained had a strength of 835 N/mm$^2$ at an elongation of 5.6% and a density of 2.12 g/cm$^3$. The initial thickness was reduced to 0.0236 mm, the width to 1.4 mm.

The PTFE tapes obtained could be processed to a weaving yarn (twisted or untwisted) and to a sewing yarn (double twisted).

EXAMPLE 2

PTFE pressed to a rod as in Example 1 was rolled to a film of 0.114 mm thickness and dried. This film was guided over rolls 3', 3" heated to 375° C., at a width of 200 mm and simultaneously sintered. Immediately upon sintering it was stretched at a ratio of 1:15. The strength of the film obtained was 692 N/mm$^2$ at an elongation of 7.5% and a density of 2.17 g/cm³. The dielectric breakdown strength was 190 kV/mm. The film had a width of 46.6 mm and a thickness of 0.024 mm.

The film was free of pores, exhibited good sliding characteristics and excellent electric insulating properties and is excellently suited to wrap electric conductors.

EXAMPLE 3

PTFE pressed to a rod as in Example 1 was rolled to a film of 0.05 mm thickness and dried. The film was cut into strips having a width of 25 mm, guided over rolls 3', 3" heated to 385° C. and simultaneously sintered. Subsequently, stretched at a ratio of 1:15, thus a strength of 703 N/mm² at an elongation of 5.6% and a density of 1.93 g/cm³, was obtained. The width was 5.8 mm and the thickness was 0.013 mm.

What we claim is:

1. The process for the production of a monoaxially stretched shaped article consisting essentially of polytetrafluoroethylene (PTFE) and having strength values in the stretching direction of at least 500 N/mm² and a density of between 1.80 and 2.30 g/cm³, which process comprises:

providing a pasty mass containing PTFE powder, continuously forming said pasty mass to a shaped body, guiding said shaped body over a plurality of rollers or rolls, and heating and stretching said shaped body, wherein the improvement comprises heating said shaped body to a temperature of between 327° and 450° C. and simultaneously sintering said body without stretching, and thereafter stretching said body while said body is at a temperature of between 327° and 450° C.

2. A process as set forth in claim 1, wherein said shaped body is heated to between 350° and 390° C.

3. A process as set forth in claim 1 to be performed in an arrangement comprising a heated roll or pairs of rollers and an unheated take off unit, wherein said shaped body is stretched between said roll or pairs of rollers heated to a temperature of between 327° and 450° C. and said unheated take off unit.

4. A process as set forth in claim 3, wherein at least one of said rolls is heated to between 350° and 390° C.

5. A process as set forth in claim 1, wherein said shaped body is stretched at a ratio of between 1:5 and 1:30.

6. A process as set forth in claim 1, wherein said shaped body is stretched at a ratio of between 1:10 and 1:20.

* * * * *